United States Patent [19]

Namura et al.

[11] 4,185,248

[45] Jan. 22, 1980

[54] INPUT LEVEL SUPERVISORY SYSTEM FOR LEVEL REGULATOR

[75] Inventors: Hisaki Namura; Koichi Ohta, both of Kawasaki; Masao Takeda, Hachioji; Kiyoshi Minematsu, Kawasaki, all of Japan

[73] Assignee: Fujitsu Limited, Kawasaki, Japan

[21] Appl. No.: 938,396

[22] Filed: Aug. 31, 1978

[30] Foreign Application Priority Data

Aug. 31, 1977 [JP] Japan ................................. 52/104455

[51] Int. Cl.² .............................................. H03G 3/20
[52] U.S. Cl. .......................................... 330/2; 330/52; 330/132
[58] Field of Search .................... 330/2, 52, 132, 143; 325/407; 179/15 BP, 170 A; 333/15, 16

[56] References Cited

U.S. PATENT DOCUMENTS 3,178,698  4/1965  Graham ............................ 330/52 X

FOREIGN PATENT DOCUMENTS 1140235  1/1969  United Kingdom ........................ 330/2

*Primary Examiner*—James B. Mullins
*Attorney, Agent, or Firm*—Staas & Halsey

[57] ABSTRACT

Disclosed is a system for supervising the level of input applied to a level regulator using a pilot signal. According to the invention, an input level supervisory circuit is provided which utilizes a level adjusting variable element of the level regulator, or employs a particular variable element arranged to be driven by means of the control voltage for said level adjusting variable element simultaneously with the latter element and having characteristics equal thereto, and which has a transmission ratio in a reciprocal or inverse relationship to the alternating current transmission ratio of a main signal alternating current transmission line of the level regulator. The input level supervisory circuit is supplied with an input voltage or current from a direct current constant-voltage power source or a direct current constant-current power source to generate an output voltage by means of which supervision of the level of the pilot signal input to the level regulator is performed.

6 Claims, 14 Drawing Figures

$T_1, T_2$: INPUT OUTPUT TRANSFORMER
$R_1, R_2$: IMPEDANCE MATCHING RESISTOR
$\mu$: AMPLIFIER

| Fig.7A | Fig.7B | Fig.7C |

| TYPE 3 | TYPE 4 |
|---|---|
|  |  |
| $f(Rv) = -\dfrac{Ro}{Rv}$ | $f(Rv) = -\dfrac{Rv}{Ro}$ |
|  |  |
| $F(Rv) = \dfrac{1}{f(Rv)} = \dfrac{-Rv}{Ro}$ | $F(Rv) = \dfrac{1}{f(Rv)} = -\dfrac{Ro}{Rv}$ |
| | |
|  | |
| $Vout = \dfrac{Ro\,I}{f(Rv)} = Rv \cdot I$ | |
|  |  |
| $\dfrac{1}{Ro} \cdot f(Rv) = \dfrac{1}{Rv}$ | $\dfrac{Ro}{f(Rv)} = \dfrac{1}{Rv}$ |

INPUT LEVEL SUPERVISORY SYSTEM FOR LEVEL REGULATOR

BACKGROUND OF THE INVENTION

1. Field of the Invention

The present invention relates to an input level supervisory system in an automatic gain controller, and more particularly to a system for supervising the level of input applied to a level regulator of carrier frequency terminal equipment, which has highly accurate performance and can be manufactured at low costs.

2. Description of the Prior Art

The level regulator used in carrier frequency terminal equipment of a frequency division multiplex communication system employs an electric current of a frequency outside the carrier frequency band as a supervisory current (pilot signal). Said electric current is transmitted with a constant amplitude and variations in the level of said electric current are detected to obtain equalization of characteristics deviation, change in the temperature, etc., occurring in the transmission line, terminal stations, etc. The level regulator changes the value of a variable element thereof, such as a thermistor or a field effect transistor (FET), in accordance with the level of the electric current thus detected, so as to compress the variations in the level of the electric current into smaller values, thus regulating the level of the input.

In addition to said function of automatic level control, the level regulator is further provided with a function of supervising the level of the pilot signal. The pilot signal level being supervised is utilized for exhibiting an alarm function of transmitting a signal for lighting an alarm lamp and ringing an alarm bell when the pilot signal level exceeds a range that can be regarded as normal, and; for a pilot signal level indicating function of constantly indicating and recording the pilot signal level through a meter or a recorder for improved maintenance.

Generally, supervision of the pilot signal level includes supervision of the level of input to the level regulator and supervision of the level of output therefrom. Of these types of supervision, the output level supervision has conventionally been employed. The two types of supervision are different in the supervising accuracy of the input level. It goes without saying that it is more desirable for higher accuracy to supervise the input level than to supervise the output level which has the same relation to the input level in a compressed state. Further, the International Telegraph and Telephone Consultative Committee recommends the input level supervision as a preferable one. In a conventional method of this art, the input level supervision uses an electric voltage which varies approximately in accordance with a decibel change in the level of input to the level regulator, which voltage is available from the control voltage for driving the variable element of the level regulator or a like voltage, thus supervising a pseudo input level. To be concrete, if there is a change in the input level, the change is detected so that the gain is controlled by the thermistor or the FET of the level regulator. Since the output voltage from the control circuit for driving the thermistor or the FET is somewhat mutually related to the input level, said output voltage, i.e., control voltage, is directly used to supervise a pseudo input level.

Further, an improved method of the above-mentioned conventional supervising method has been proposed by German Patent P 22 35 230.3, owned by Siemens Aktiengesellschaft. According to this method, said control voltage is input to a non-linear element of a correcting circuit to produce an electric voltage more proportional to the input level, to be used as a supervisory output for a pseudo input level. However, this method is not sufficiently high in accuracy. This is because, the resulting amount of change may be too large (an elongation of the input level) or too small (a contraction of the input level) with respect to the change in the input level to perform accurate supervision of the input level.

Further, there is another conventional method, according to which the input to the level regulator is branched. A particular narrow-band pilot signal filter is provided for extracting the pilot signal, and the pilot signal thus extracted is amplified and detected for performing supervision of the input level. To be concrete, for the level regulating operation, the output is fed back to produce a predetermined electric voltage through a control circuit, and said voltage is used to drive the variable element of the level regulator to control the gain. While, for the level supervising operation, a supervisory circuit is provided separately from said gain control loop, in which an input consisting of a voice signal and a pilot signal is applied to a pilot signal filter to extract only the pilot signal, which is then amplified and rectified to be obtained as a level supervisory output. However, since this method requires a particular narrow-band crystal filter with sharp attenuation characteristics and a particular rectifier circuit, it is disadvantageous with respect to manufacturing costs and simplicity in construction.

SUMMARY OF THE INVENTION

The present invention has been devised to obviate the aforementioned conventional problems, and it is an object of the invention to provide an input level supervisory system which is capable of supervising the input level with very high accuracy and which is negligibly influenced by external disturbances such as variations in temperature and in the electric voltage of power supply, and can be constructed of a small number of parts and simple circuits, thereby permitting reduction in production costs and compacting the construction thereof.

According to the invention, there is provided a system for supervising the level of the input signal applied to a level regulator including a level adjusting circuit of a first transfer function having at least one first variable element and a terminal for inputting said input signal containing a pilot signal, and a control circuit connected to an output terminal of said level adjusting circuit for extracting said pilot signal to control said first variable element so that the transfer amount of said input signal is varied, characterized in that said system comprises an input level supervisory circuit of a second transfer function, said supervisory circuit comprising an input terminal which is supplied with a constant input and at least one second variable element having characteristics equal to those of said first variable element and being varied by said extracted pilot signal from said control circuit so that the transfer amount of said constant input is varied.

Further, according to the present invention, there is also provided a system for supervising the level of an input signal applied to a level regulator including a level adjusting circuit for a first transfer function having a terminal for inputting said input signal containing a pilot signal and a control circuit connected to an output terminal of said level adjusting circuit for extracting said pilot signal to control the transfer amount of said input signal, characterized in that said system has an input level supervisory circuit of a second transfer function, said input level supervisory circuit comprising an input terminal which is supplied with a constant input, said level adjusting circuit of said first transfer function and said input level supervisory circuit of said second transfer function provide commonly a variable element, and said variable element is varied by said pilot signal extracted from said control circuit so that the transfer amount of said constant input is varied.

Further features and advantages of the present invention will be apparent from the ensuing description with reference to the accompanying drawings to which, however, the scope of the invention is in no way limited.

DESCRIPTION OF THE PREFERRED EMBODIMENT

Figure 1:
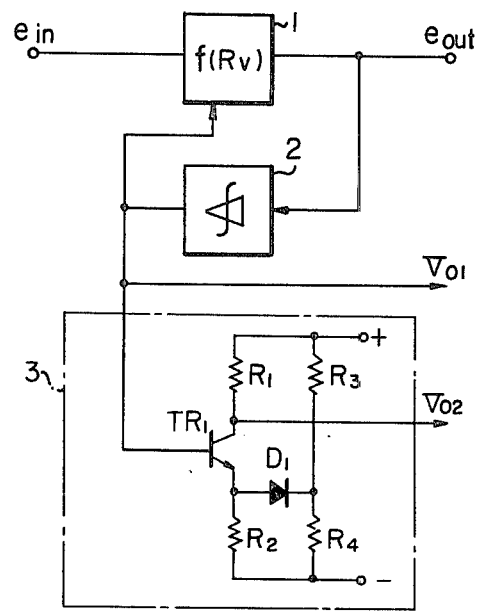
FIG. 1 is a block diagram showing an example of the conventional input level supervisory system for a level regulator.

FIG. 1 illustrates an example of the conventionally proposed systems, which appears in German Patent P 22 35 230.3, owned by Siemens Aktiengesellschaft. The system of FIG. 1 used an electric voltage varying approximately in accordance with the decibel change in the input level applied to the level adjusting circuit 1, which voltage is available from the control voltage for driving the variable element used in the lever adjusting circuit, or a like voltage, thus performing supervision of a pseudo input level. More specifically, in FIG. 1, if there is a change in the input level $e_{in}$, said change is detected so that gain control is effected by the thermistor or the FET of the level adjusting circuit 1. Since the output voltage from the control circuit 2, for driving the thermistor or the FET is somewhat mutually related to the input level, this control voltage is directly used as an output $V_{01}$ for supervision of a pseudo input level. Alternatively, said control voltage is applied to a non-linear element of the input level supervisory circuit, i.e., the base of transistor $TR_1$, to produce an electric voltage more proportional to the input level $e_{in}$ as a supervisory output $V_{02}$ for a pseudo input level. That is, although the output from the control circuit 2 is input to the base of transistor $TR_1$, a change in this input voltage is not equal to the decibel change in the input level. Therefore, this unequalness is compensated for by means of the non-linear impedance characteristics of a diode $D_1$ which is biased by a voltage divider consisting of resistors $R_3$ and $R_4$ located on the emitter side of transistor $TR_1$. Thus, the input level supervising voltage is available by picking out an electric current from the emitter of transistor $TR_1$, which has been made to approximate the decibel change in the input level as an electric voltage by means of collector resistor $R_1$.

Figure 2A:
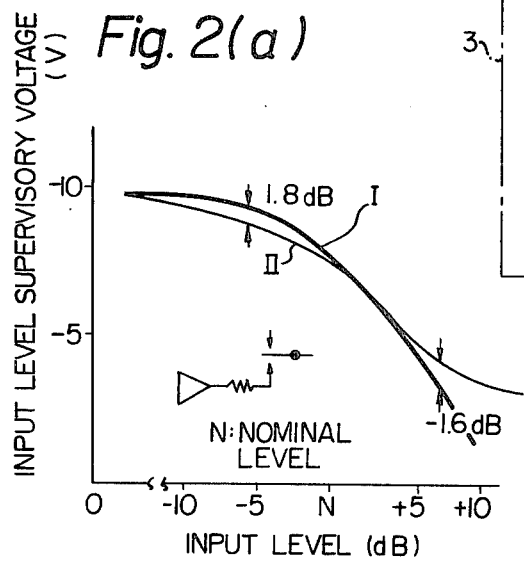
FIGS. 2(a) and 2(b) are graphical representations showing the performance characteristics of the system of FIG. 1.

FIG. 2(a) shows the characteristic curve of the output voltage $V_{01}$ obtained by the circuit arrangement shown in FIG. 1, with reference to an ideal curve. In FIG. 2(a), Curve I represents an ideal curve which is theoretically obtained with respect to the input level, and Curve II a change in the output voltage level $V_{01}$ with respect to the input level. The deviation of Curve II from Curve I is calculated to be +1.8 dB and −1.6 dB respectively at the input levels of −6 dB and +6 dB of output voltage $V_{01}$. To reduce the deviation, Siemens Aktiengesellschaft employs the circuit 3 in which a diode is used to improve the accuracy in the input supervisory voltage with respect to the input level. However, such circuit has been designed by first determining Curve II and then approximating it to the ideal Curve I, and accordingly has the following drawbacks.

Figure 2B:
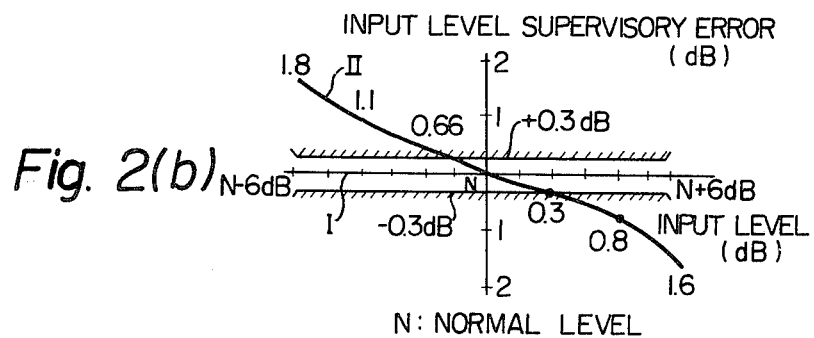

(a) Since the circuit in FIG. 1 is an approximating circuit making use of the non-linear impedance of a diode, transistor or FET, there is a limit in the accuracy of approximation. That is, there still occurs a deviation of about 1 dB in an input level range of from −6 dB to +6 dB. In this regard, particularly in carrier frequency terminal equipment, the deviation should desirably be kept within ±0.3 dB in the input level range of from −6 dB to +6 dB, as shown in FIG. 2(b).

(b) A diode, transistor and FET suffer large fluctuations in performance due to temperature fluctuations in the region in which they have non-linear impedances, so that there occur fluctuations in the input level supervisory voltage due to temperature fluctuations.

(c) The operating voltage for non-linear elements to achieve good approximating characteristics thereof vary with each piece, and accordingly, inspection or adjustment of such elements is required piece by piece before use.

Thus, the system in FIG. 1 is not sufficiently high in accuracy. The system suffers an excessive amount of change (elongation) or a small amount of change (contraction) with respect to a change in the input level, thus being unable to perform accurate supervision of the input level.

Figure 3:
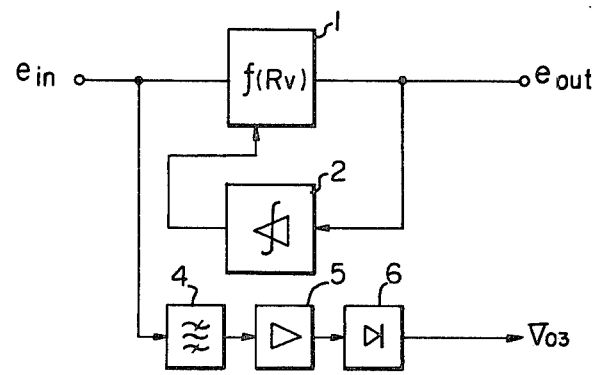
FIG. 3 is a block diagram showing another example of the conventional input level supervisory system for a level regulator.

Next, the circuit shown in FIG. 3 will be discussed. The circuit in FIG. 3 includes a narrow-band pilot signal filter 4 for branching an input $e_{in}$ to a level adjusting circuit to extract a pilot signal which is then amplified at 5 and detected at 6, thus performing supervision of the input level. More specifically, for the level regulating operation, the output from the level adjusting circuit 1 is fed back through the control circuit 2 to produce a predetermined voltage for driving the variable element of the level adjusting circuit 1 to control the gain; whereas for the level supervising operation, independently of said gain control loop, the input $e_{in}$ consisting of a voice signal and a pilot signal is applied to a pilot signal filter 4 for extracting only the pilot signal. The pilot signal thus extracted is then amplified and rectified to be a level supervisory output $V_{03}$. However, the system of FIG. 3 is disadvantageous with respect to manufacturing costs and compactness in construction, because it requires use of a particular narrow-band crystal filter having sharp attenuation characteristics and a particular rectifier circuit.

Details of the present invention will be described hereinbelow with reference to the drawings.

Figure 4:
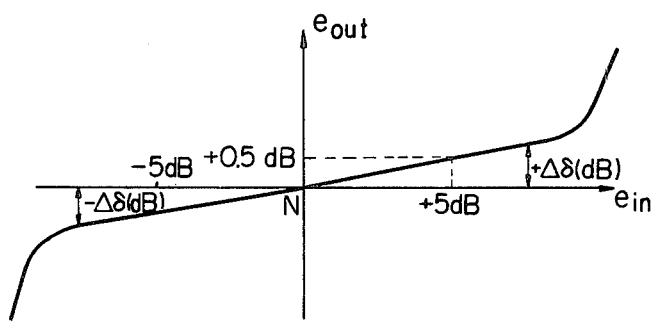
FIG. 4 is a graphical representation showing the compression characteristics of the level regulator.
Figure 5:
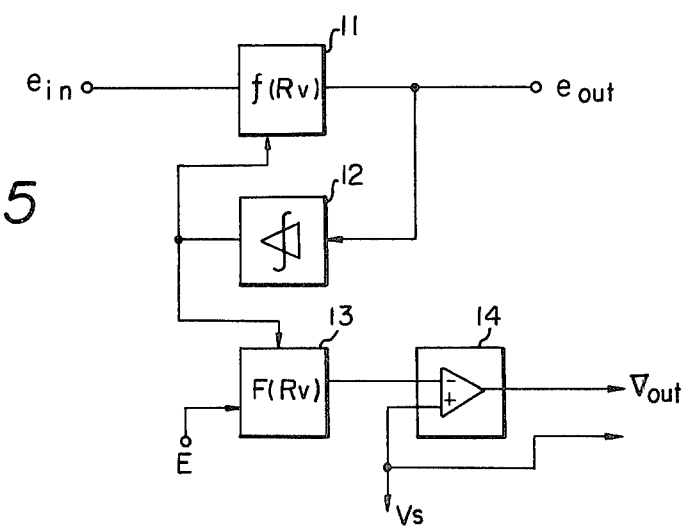
FIG. 5 is a block diagram showing an embodiment of the input level supervisory system for a level regulator according to the invention.
Figure 6A:
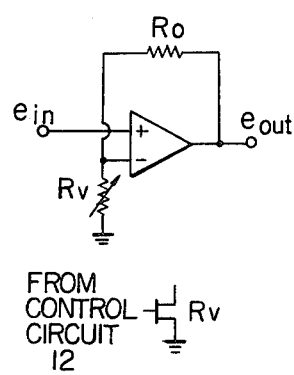
FIGS. 6A, 6B, and 6C are connection diagrams showing concrete examples of the level adjusting circuit and the input level supervisory circuit of FIG. 5.
Figure 6B:
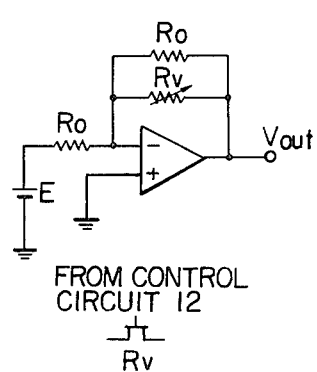
Figure 6C:
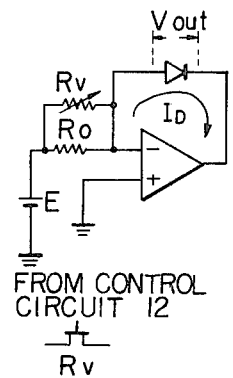
Figure 6D:
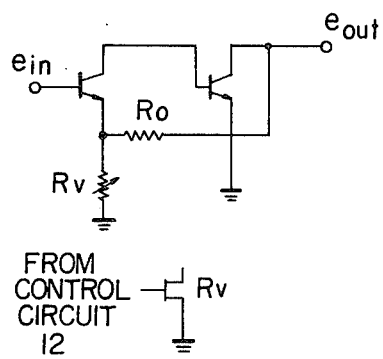
FIGS. 6D and 6E are connection diagrams showing further examples of the circuits of FIG. 5.
Figure 6E:
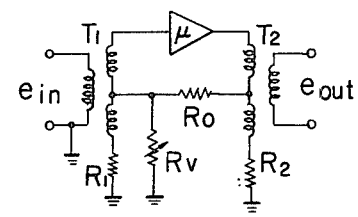
Figures 7, 7A:
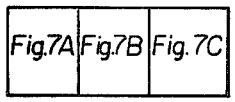
FIGS. 7A, 7B and 7C are tables showing various forms of circuits embodying the circuits of FIG. 5.

FIG. 4 is a graph showing the compression characteristics of the level regulator, FIG. 5 a block diagram showing the input level supervisory circuit, FIGS. 6A, 6B, 6C, 6D and 6E are connection diagrams showing concrete examples of the level adjusting circuit and input level supervisory circuit of FIG. 5, and FIG. 7 a comparison table showing various types of circuits embodying the circuits of FIG. 5.

In FIG. 5, numeral 11 denotes a level adjusting circuit including a level adjusting variable element Rv, 12, a control circuit comprising a pilot filter, a rectifier, an amplifier and a discriminator, 13 a supervisory circuit which consists of the same level adjusting variable element of the level adjusting circuit 11 or another variable element which is arranged to be driven simultaneously with said level adjusting variable element and has characteristics equal to those of the same element, 14 an amplifier which is dispensable and which is adapted to amplify the output from the supervisory circuit 13 to a required level, $V_s$ a reference voltage, and $V_{out}$ an input level supervisory output which is to be connected to an alarm circuit, a meter or recorder.

To explain the principle of operation of the invention embodied in FIG. 5, the principle of how to regulate the input level is hereby formulized. Assuming that when there is a change $\Delta eN$ (dB) in the input level, the resistance value of the adjusting variable element is Rv at a normal input level and the amount of adjustment by the regulating operation is $\Delta Rv$, the following relationship is established:

$$\pm \Delta eN \text{(dB)} = \mp [20 \log \frac{f(Rv \pm \Delta Rv)}{f(Rv)} + \Delta\delta(\text{dB})] \quad (1)$$

wherein $\Delta\delta$(dB) is the balance of adjustment, symbol $\pm$ of $\pm\Delta Rv$ the polarity of the system, and f(Rv) the transmission ratio of the level adjusting circuit.

The above formula (1) represents that the change $\Delta eN$ (dB) in the input signal level is compensated by the change $20 \log\{[f(Rv\pm\Delta Rv)]\} - 20 \log f(Rv)$ in the transmission ratio of the level adjusting circuit 11, so that the output consists merely of a change in the balance of adjustment $\Delta\delta$(dB).

Now, assume that a function F(Rv) has the following relation to the transmission ratio of f(Rv) of the level adjusting circuit 11 in said formula (1):

$$F(Rv) = \frac{1}{f(Rv)} \quad (2)$$

If said function F(Rv) is substituted into said formula (1), the following equation is obtained:

$$\pm \Delta eN \text{(dB)} = \pm [20 \log \frac{F(Rv)}{F(Rv + \Delta Rv)} + \Delta\delta \text{(dB)}] \quad (3)$$

If the function F(Rv) is thus substituted, the right and left members of the equation have the same symbol $\pm$, and also, the change in the transmission ratio becomes nearly equal to the change $\Delta eN$ in the input level. That is, it will be noted that, if a level supervisory circuit 13 is provided which has a reciprocal transmission ratio $F(Rv) = 1/f(Rv)$ as against the transmission ratio f(Rv) of the level adjusting circuit 11, the decibel change $\Delta eN$ in the input level applied to the level adjusting circuit 11 and the change in the transmission ratio of the output from the level supervisory circuit 13 are equal to each other both in amount of change (dB) and polarity ($\pm$), except for the balance of the adjustment of the input level $\Delta\delta$(dB).

Although the level supervisory circuit 13 having a transmission ratio as expressed by Formula (2) contains as an error a term $\Delta\delta$(dB), representing the balance of adjustment as evident from Formula (3), the value of said term can be sufficiently reduced to a negligible value by suitably setting the compression ratio and range of adjustment of the level adjusting circuit 11. Further, said error can be minimized by correcting the gain of the amplifier 14 of FIG. 5 according to necessity. That is, the compression characteristics of the level adjusting circuit 11 present a curve as shown in FIG. 4 for instance, according to which, when there is a change of +5 dB in the input with respect to the normal level N of input $e_{in}$, there is only a change of +0.5 dB in the output $e_{out}$ from the level adjusting circuit 1. In this instance, the compression ratio of the level adjusting circuits 11, 12 is 10:1, and said value of +0.5 dB is the balance of adjustment $\Delta\delta$(dB). Since usually the compression ratio is set at a large ratio of from 10:1 to 20:1, the error can thus be small. If the plus side and the minus side of the input level are symmetrical with respect to the normal input level N, that is, the balances $\Delta\delta$ on the plus and minus side are equal to each other, the error can be reduced to zero: that is $\{(|+\Delta\delta|-|-\Delta\delta|)/2\}$ by applying a gain correction of $(|+\Delta\delta|+|-\Delta\delta|)/2$ to the amplifier 14 of FIG. 5. However, since in general the range of adjustment is applied to changes of $\pm 5$ dB or $+4$ dB in the input level, the level regulator is operated within a small range of balance of adjustment $\Delta\delta$ so that practically high accuracy is available.

Referring to FIGS. 6A, 6B and 6C the description is now directed to concrete examples of the level adjusting circuit 11 and level supervisory circuit 13 of FIG. 5, in which the feedback amplifier is embodied by an operational amplifier.

FIG. 6A shows an arrangement in which the level adjusting circuit 11 consists of a non-inverted amplifier, the transmission ratio of which is expressed as:

$$f(Rv) = 1 + (Ro/Rv) = (Rv + Ro)/Rv \quad (4)$$

where Rv is a resistance value of variable element and Ro a value of fixed resistance.

Incidentally, FIG. 6D shows another example of the circuit having the same type of transmission ratio as that of FIG. 6A, but composed of discrete transistors, and FIG. 6E a further example of the circuit embodying a hybrid feedback amplifier.

FIG. 6B shows an arrangement embodying the level supervisory circuit 13 which has a transmission ratio in a reciprocal or inverse relationship to the transmission ratio of the level adjusting circuit 11 of FIG. 6A (f(Rv) of said Formula (4)). In FIG. 6B, the transmission ratio F(Rv) to the output of the input supplied from a constant-voltage power source is expressed as:

$$F(Rv) = -Rv/(Rv+Ro) \quad (5)$$

In this instance, Rv, the resistance value of the variable element of said Formula (5), represents either the resistance value of the level adjusting variable element itself or the resistance value of another variable element, specially provided for level supervision, which is driven simultaneously with said level adjusting variable element and has characteristics equal to the latter element. Therefore, the level supervisory circuit 13 of FIG. 6B has an output voltage expressed as:

$$V_{out} = -\frac{Rv}{Rv + Ro} E \quad (6)$$

Said output voltage is a supervisory voltage which is free of both contraction and elongation of the input level with respect to the decibel change in the input level, owing to the relationship of said Formula (3).

As described above, according to the present invention, either a level adjusting variable element itself or another particular variable element having characteristics equivalent thereto is used to provide a circuit which has a transmission ratio in a reciprocal relationship to the transmission ratio of the level adjusting circuit with respect to a constant direct current power source, thus permitting supervision of the input level free of contracting and elongation of said level.

In addition, the variable element Rv in the level adjusting circuit shown in FIG. 6A and the variable element Rv in the level supervisory circuit can be commonly used as one variable element. Since the level adjusting circuit shown in FIG. 6A produces an alternating current and the level supervisory circuit produces a direct control current, the alternating current and the direct current can be separated by using a coil. For the purpose of using the variable element Rv commonly in the level adjusting circuit and the level supervisory circuit, the earth terminals of the variable element Rv shown in FIG. 6A and of the variable element Rv shown in FIG. 6B are connected as one common terminal, and the other terminals of the variable elements are connected via a coil L so that the characteristics of the level adjusting circuit and of the level supervisory circuit are not affected by the use of the common variable element.

Further, according to the invention, not only the supervisory voltage is indicated in decibels, but also the output supplied to the recorder and the meter can be indicated in linear representation corresponding to the decibel change in the pilot input level. Meters in general have linear scales, while recorders should also desirably have linear scales because the scales in decibel representation have too small of a space between scale lines towards the lower-level ends thereof. Further, linear representation is preferable for the operation to obtain a higher degree of accuracy of reading.

The arrangement of FIG. 6C is based upon the same principle of that of FIG. 6B, in which an admittance transmission ratio containing the transmission ratio f(Rv) of the level adjusting circuit 11 is available in a manner that an electric current $I_D$ corresponding to the decibel change in the input level applied to the level adjusting circuit 11, expressed as:

$$I_D = \frac{1}{Ro} \left( \frac{Rv + Ro}{Rv} \right) \cdot E \quad (7)$$

is obtained and supplied to a logarithmic-to-linear-conversion element (a diode in FIG. 6C). The relationship of the current $I_D$ to the voltage between the opposed ends of the diode as characteristics of the diode can be expressed in the equation:

$$I_D \neq I_S \left\{ \exp\left(\frac{qV_o}{kT}\right) \right\} \quad (8)$$

where $I_S$ is a saturation voltage inherent in the diode. The two members of said equation (8) can be expressed in the form of natural logarithm as:

$$\ln I_D \approx \frac{qV_o}{kT} + \ln(I_s) = KV_o + C \quad (9)$$

where c is a constant.

As will be evident from the equation (9), if the current flowing through the diode varies with coefficient ln, the voltage Vo between the opposed ends of the diode varies in a linear manner. That is, an equation (q/kT)=(constant) is set up, if the change in temperature is not contemplated, and accordingly, $Vo \alpha \log I_D$ is established, except the constant term. Since the natural logarithm ln and the common logarithm log are in proportion to each other, the decibel change in the input level can be supervised in linear representation if the linear output voltage Vo is picked up as input level supervisory output $V_{out}$.

Since the input level supervisory voltage Vo subjected to logarithmic-to-linear conversion is thus in linear form, and its manner of increasing is identical to its manner of descreasing in amount and curve with respect to the normal or central value thereof, the admittance transmission ratio may be composed of either a transmission ratio the same as the transmission ratio of the level adjusting circuit 11 or a function containing a transmission ratio in a reciprocal relationship to said transmission ratio of the circuit 11. By thus utilizing the voltage Vo subjected to logarithmic-to-linear conversion, supervision of the input level is available through a meter or a recorder which can easily be monitored by the operator.

Figure 7B:
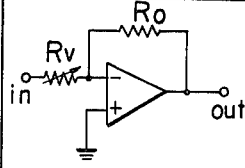
Figure 7B:
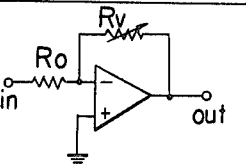
Figure 7B:
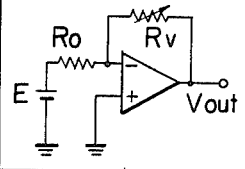
Figure 7B:
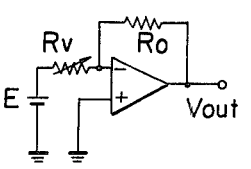
Figure 7B:
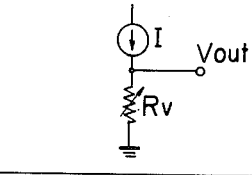
Figure 7B:
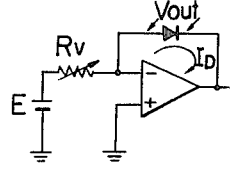
Figure 7B:
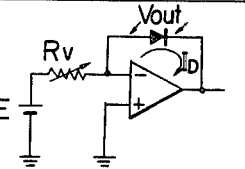
Figure 7C:
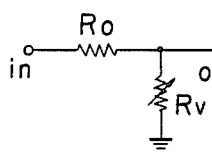

FIGS. 7A, 7B and 7C show six types of circuits embodying the level adjusting circuit 11 and the input supervisory circuit 13 coupled thereto shown in FIG. 5. Although the level adjusting circuit itself is usually composed of discrete transistors to meet strict requirements of non-linear distortion, etc., the circuits of FIG. 7 according to the present invention are classified by operational amplifiers. The input level supervisory circuit 13 is largely classified into those which produce logarithmic outputs and those which produce linear outputs. The logarithmic output type is further classified into constant-voltage type and constant-current type, as well as into convertion type and non-conversion type. It should be noted that a transmission ratio is indicated under each circuit diagram. In the type producing logarithmic output with respect to the transmission ratio f(Rv) of the level adjusting circuit, the transmission ratio of the input level supervisory circuit is expressed as a reciprocal transmission ratio 1/f(Rv), while in the type producing linear output which is provided with a logarithmic-to-linear conversion circuit, the transmission ratio is expressed as an admittance transmission ratio f(Rv)/Ro (or 1/(f(Rv).Ro), Ro/f(Rv).

As described above, according to the system of the present invention, a change in the transmission ratio, inclusive of that of a variable element controlled by a closed loop, is subjected to voltage conversion or current conversion, followed by logarithmic-to-linear conversion to obtain a linear voltage as an input supervisory voltage. Thus, the system is negligibly influenced by external disturbances such as temperature variation and fluctuations in the power supply voltage. Further, by employing an operational amplifier, it has become possible to easily obtain a reciprocal transmission ratio and an admittance transmission ratio from the alternating current transmission ratio of the level adjusting circuit, thereby permitting supervision of the input level with very high accuracy. Furthermore, the system according to the present invention can be constructed of a small number of parts and of simple circuits, thus leading to compactness in construction and reduction in production costs.

What is claimed is:

1. A system for supervising the level of an input signal applied to a level regulator including a level adjusting circuit of a first transfer function having at least one first variable element and a terminal for inputting said input signal containing a pilot signal, and a control circuit, connected to an output terminal of said level adjusting circuit, for extracting said pilot signal to control said first variable element so that the transfer amount of said input signal is varied, characterized in that said system comprises an input level supervisory circuit of a second transfer function having at least one second variable element, said input level supervisory circuit comprising an input terminal which is supplied with a constant input and said second variable element having characteristics equal to those of said first variable element and being varied by said extracted pilot signal from said control circuit so that the transfer amount of said second transfer function is varied, wherein said second transfer function of said input level supervisory circuit has a reciprocal relationship with said first transfer function of said level adjusting circuit.

2. The system as claimed in claim 1, wherein said constant input is a predetermined constant voltage.

3. The system as claimed in claim 1, wherein said constant input is a predetermined constant current.

4. The system claimed in claim 1, wherein said input level supervisory circuit comprises:
 (1) an admittance circuit including said second variable element having characteristics equal to those of said first variable element, said admittance circuit having a transfer function corresponding to said first transfer function of said level adjusting circuit;
 (2) a direct current constant-voltage for supplying an input to said admittance circuit, and
 (3) a non-linear element for logarithmically converting an output current from said admittance circuit, whereby supervision of the input level applied to said level regulator is performed by an electric voltage obtained by linear conversion of a decibel change in the input level applied to said level regulator.

5. The system as claimed in claim 4, wherein said input level supervisory circuit comprises an operational amplifier which has an input terminal connected to said constant-voltage through a circuit of the transfer function corresponding to said first transfer function including said second variable element, said non-linear element being connected between said input terminal and an output terminal of said amplifier.

6. A system for supervising the level of an input signal applied to a level regulator including:
 a level adjusting circuit of a first transfer function having at least one first variable element and a terminal for inputting said input signal containing a pilot signal;
 a control circuit, connected to an output terminal of said level adjusting circuit, for extracting said pilot signal to control said first variable element so that the transfer amount of said input signal is varied;
 an input level supervisory circuit of a second transfer function having at least one second variable element, said input level supervisory circuit comprising
 an admittance circuit including said second variable element having characteristics equal to those of said first variable element, and an operational amplifier operatively connected to said second variable element,
 a direct current constant-voltage for supplying an input to said admittance circuit,
 a non-linear element for logarithmically converting an output current from said admittance circuit, said non-linear element being operatively connected to an input of said operational amplifier and the output of said operational amplifier, wherein
 said second transfer function of said input supervisory circuit has a reciprocal relationship with said first transfer function of said level adjusting circuit,
 whereby the level of the input signal applied to said level regulator is supervised by an electric voltage obtained by linear conversion of a decibel change in the level of the input signal applied to said level regulator.

* * * * *

UNITED STATES PATENT AND TRADEMARK OFFICE
CERTIFICATE OF CORRECTION

PATENT NO. : 4,185,248
DATED : January 22, 1980
INVENTOR(S) : HISAKI NAMURA et al It is certified that error appears in the above—identified patent and that said Letters Patent is hereby corrected as shown below:

Column 3, line 55, delete "lever", insert --level--.

Signed and Sealed this

Eighth Day of July 1980

[SEAL]

Attest:

SIDNEY A. DIAMOND

Attesting Officer

Commissioner of Patents and Trademarks